United States Patent [19]

Hunter

[11] 4,059,227

[45] Nov. 22, 1977

[54] MOISTURE SENSING APPARATUS AND METHOD

[75] Inventor: Edwin J. Hunter, Rancho Santa Fe, Calif.

[73] Assignee: The Toro Company, San Marcos, Calif.

[21] Appl. No.: 687,356

[22] Filed: May 17, 1976

[51] Int. Cl.² .................. B05B 12/12; A01G 25/16; G01F 23/06
[52] U.S. Cl. .......................................... 239/1; 73/314;
73/319; 137/41; 137/78; 222/37; 239/66; 239/67; 239/73
[58] Field of Search .......................... 239/1, 11, 63–71, 239/73; 137/2, 41, 78, 101.25, 101.27, 409, 411, 412, 624.15, 624.2, 429; 222/37, 51, 67; 73/448, 451, 453, 73, 224, 305, 306, 309, 310, 313, 314, 319, 322.5; 202/84 R, 84 C; 340/244 A

[56] References Cited

U.S. PATENT DOCUMENTS

| | | | |
|---|---|---|---|
| 2,946,512 | 7/1960 | Richards | 239/63 |
| 3,339,842 | 9/1967 | Hoeppel | 239/70 X |
| 3,361,356 | 1/1968 | Johnson et al. | 137/78 X |
| 3,646,293 | 2/1972 | Howard | 340/244 A X |
| 3,946,177 | 3/1976 | Carrico | 73/313 X |

Primary Examiner—John J. Love
Assistant Examiner—Andres Kashnikow
Attorney, Agent, or Firm—Poms, Smith, Lande & Glenny

[57] ABSTRACT

Method and apparatus for sensing moisture by exposing water in a container to the atmosphere, sensing changes in the volume of the exposed water due to ambient weather conditions, controlling an electrical signal related to the sensed change and controlling the operation of an irrigation system, such as a plurality of solenoid-actuated pilot valves associated with sprinklers of the irrigation system, in response to the signal.

16 Claims, 4 Drawing Figures

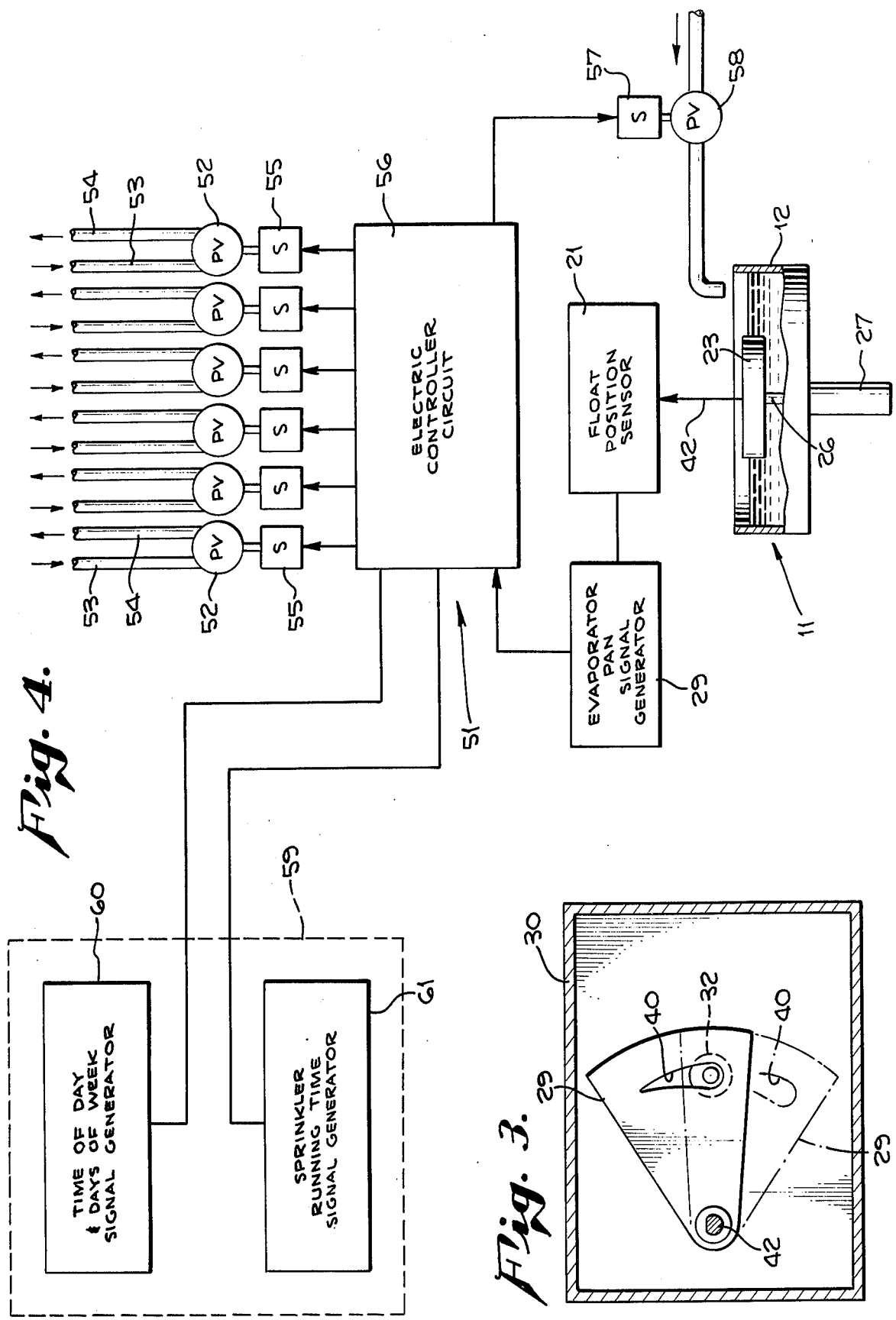

MOISTURE SENSING APPARATUS AND METHOD

BACKGROUND OF THE INVENTION

1. Field of the Invention

The invention relates to irrigation systems; and, more particularly, to a method and apparatus for controlling the watering periods of an irrigation system in response to ambient weather conditions.

2. Description of the Prior Art

Various systems have been suggested in the past for providing automatic irrigation control utilizing the various factors that determine the evaporation power of air and thus the loss of vapor from vegetation and soil to effect control of plant irrigation.

For example, U.S. Pat. No. 2,766,070 to Park shows a system having a collector pan for collecting water during sprinkling and turning off the sprinkler system when a predetermined amount of water has been sprinkled. The system automatically turns on again when the water in the collecting pan has evaporated or drained through an adjustable outlet valve. In the Park system, there is no control of the sprinkler system between the "full" and the "empty" condition of the collector pan.

In U.S. Pat. No. 2,776,860 to Griffis, an electronic control is disclosed for a sprinkler system which is operated in response to a collector pan or catcher 11. The presence of water in pan 11 due to rain or sprinkled water is detected and electronically operates an associated sprinkler valve. However, Griffis does not use the pan 11 as an evaporation pan. Graffis uses a funnel for collecting the water and a reservoir for storing it, but the water leaves this reservoir by draining through an adjustable orifice 19 rather than by evaporation. The idea of Griffis system is to respond to the amount of water falling on the ground either through the sprinklers or through rain, but no attempt is made to make it responsive to the amount of water evaporated from an evaporation pan. Further, this type of device would generally be limited to a single valve since it would require a separate system for each valve it operated and thus its cost would be prohibitive in a large scale system. Further, Griffis' system has no control over the time of day the sprinklers would operate.

In a U.S. Pat. No. 2,946,512 to Richards, a system is disclosed which uses an evaporation pan 1 to collect water from a sprinkler and is adapted to close a pair of contacts when a predetermined weight of water has evaporated from the pan. The contacts are opened when a predetermined weight of water is collected in the pan. Again, the system is operative only at the predetermined weights and only a single sprinkler is controlled.

Thus, no prior art system shows a system which uses an evaporation pan to monitor a controller which controls a number of valves which may be operating a number of different types of sprinklers with different precipitation rates and, therefore, different running times.

SUMMARY OF THE INVENTION

It is an object of this invention to provide a moisture sensing control system for controlling watering periods of an irrigation system in response to ambient weather conditions.

It is a further object of this invention to provide a moisture sensing apparatus having an improved evaporation pan and improved means for sensing evaporation from the pan and controlling an electrical signal.

It is still another object of this invention to provide a system and method for sensing the amount of water evaporated from a pan and converting that to a signal which actuates a controller adapted to vary the running time of sprinklers connected thereto.

It is a further object of this invention to provide an improved method for controlling the operation of a plurality of pilot valves associated with water lines of an irrigation system.

It is still further an object of this invention to provide a method of controlling an electrical signal for input to an electrically operated controller of an irrigation system in response to varying ambient weather conditions.

These and other objects are accomplished by exposing water in a container to the atmosphere, sensing changes in the volume of the exposed water due to ambient weather conditions, controlling an electrical signal related to the sensed change and controlling the operation of an irrigation system, such as a plurality of solenoid-actuated pilot valves associated with sprinklers of the irrigation system, in response to the signal.

BRIEF DESCRIPTION OF THE DRAWING

FIG. 3 is a cross-sectional view of the apparatus of FIG. 1 taken along lines III—III thereof; and FIG. 4 is diagrammatic, partly schematic, view of a proposed system utilizing the apparatus of FIGS. 1 through 3.

DESCRIPTION OF THE PREFERRED EMBODIMENT

Figure 1:
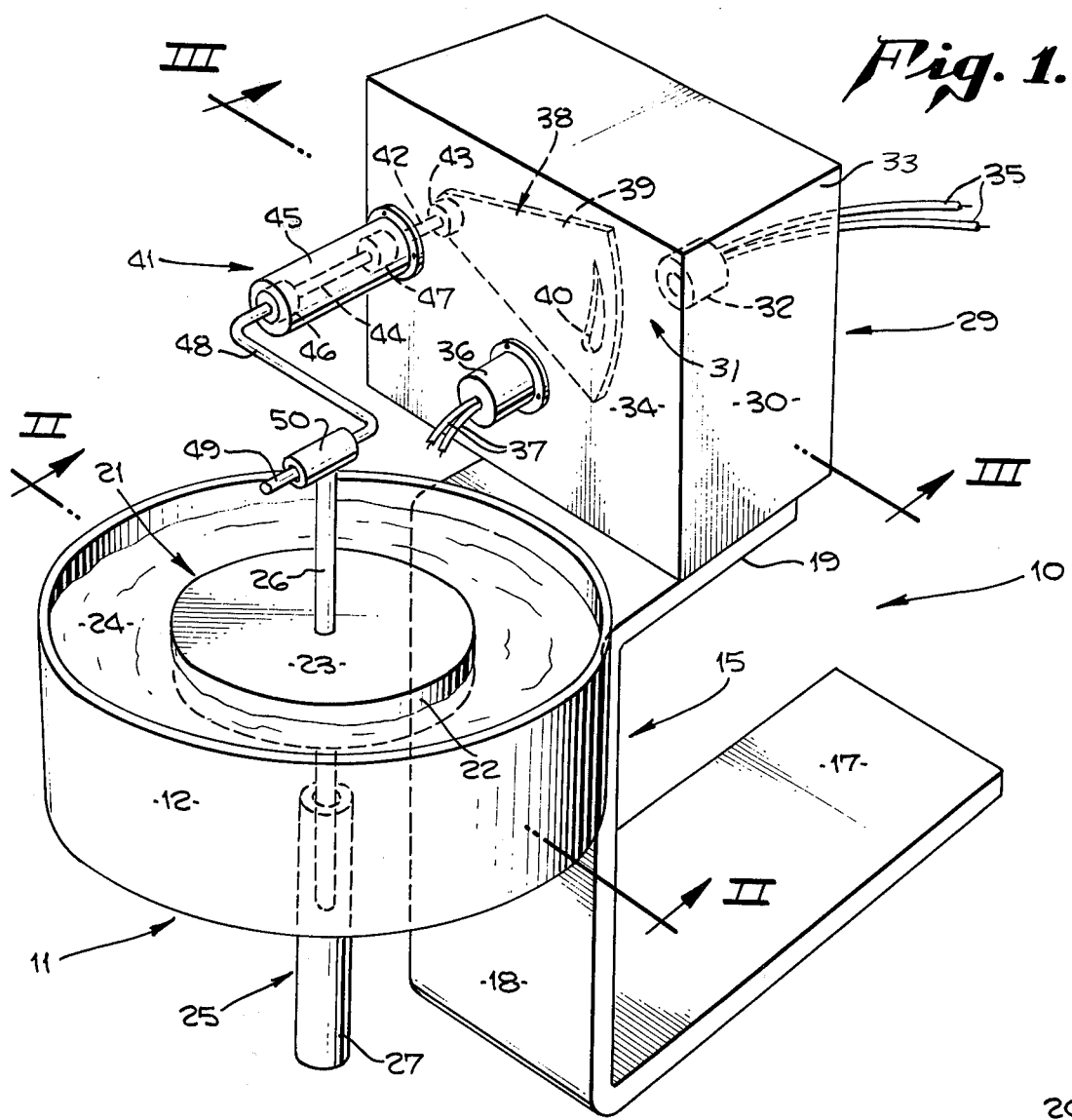
FIG. 1 is a perspective view of an evaporation pan and associated apparatus in accordance with the invention.

Referring now to FIG. 1 of the drawing, an evaporator pan moisture sensor control apparatus 10 is shown for controlling the watering periods of an irrigation system in response to ambient weather conditions. As particularly contemplated in the present invention, evaporator pan means 11 are provided for exposing a contained body of water to ambient weather conditions whereby the rate of evaporation of water therefrom varies as an integrated result of varying factors of the weather conditions. Such evaporation pan means 11, in the exemplary embodiment of the invention, includes a pan 12 mounted in a position exposed to the elements so that water evaporated from the pan 12 is a reasonably accurate integration of the weather factors that determine the amount of water that must be applied through irrigation, as will be discussed.

Figure 2:
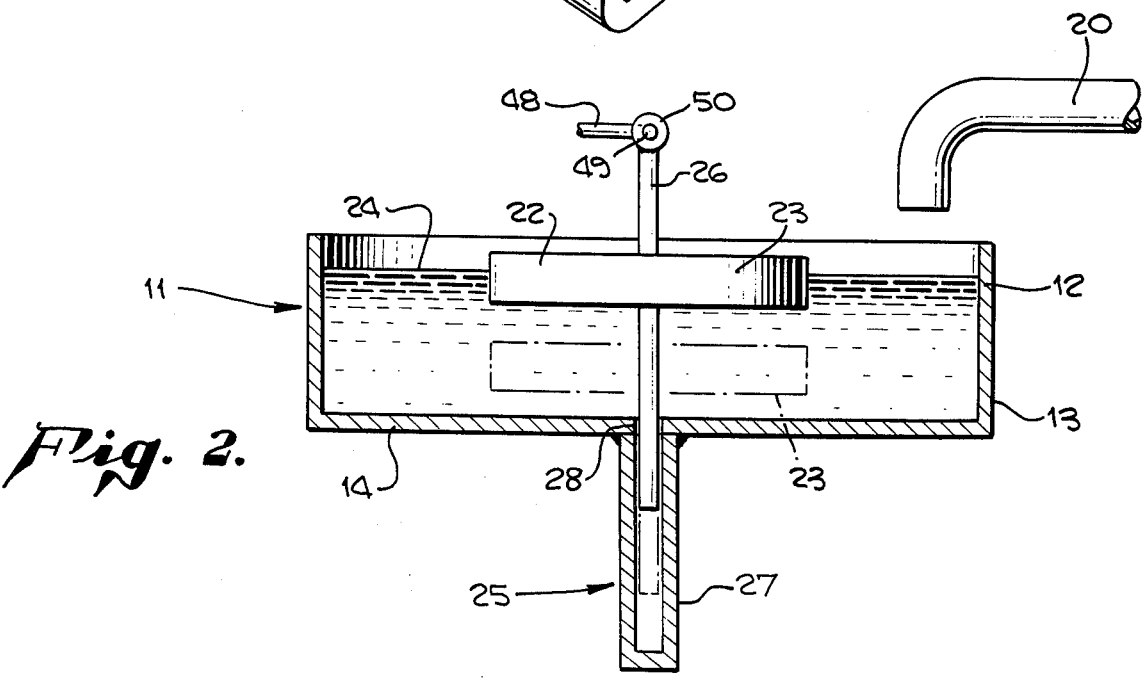
FIG. 2 is a cross-sectional view of the apparatus of FIG. 1 taken along lines II—II thereof.

Thus, as shown in FIG. 1, pan 12 may include a generally cylindrical peripheral wall 13 in fluid tight relationship with a generally circular bottom wall 14 (see FIG. 2). Pan 12 may be of any suitable dimensions and configuration and made of any suitable materials, such as plastic or the like. A stand or support 15 may be fixedly secured in any suitable manner to wall 13 to support pan 12 as shown in FIG. 1. Any suitable stand or support may be used, such as stand 15 having a generally flat horizontal bottom plate 17 adapted to rest on a surface with an integral upstanding vertical wall 18 having pan 12 fixed at the top thereof. A top plate 19, also generally horizontal and generally parallel to plate 17, is integral with the top of side wall 18 forming a generally U-shaped support as shown in FIG. 1. As will be discussed, a refill pipe 20 (FIG. 2) may open into the top of pan 12 for refilling the same with water, as will be discussed.

As particularly contemplated in the present invention, sensing means 21 are provided for sensing the amount of water evaporated from pan 12 relative to an initial amount of water contained therein. In the exemplary embodiment of the invention, sensing means 21 includes float means 22 adapted to float on the surface of water in pan 12 and guide means 25 associated with float means 22 and pan 12 for guiding the float means 22 to move in a predetermined path of travel in response to changes in volume of the water in pan 12.

Thus, referring again to FIG. 1, in the exemplary embodiment of the invention, float means 22 includes a float member 23 floating on the surface 24 of water contained in pan 12. Guide means 25 includes a rod 26 either of one piece extending through generally the midpoint of float member 23 or two separate sections fixed on both sides thereof so as to be integral with float member 23. Rod 26 (see also FIG. 2) is vertically movable within a generally cylindrical housing or tube 27 fixed to the underside of the bottom wall 14 of pan 12. Tube 27 is hollow and preferably has an inner configuration related to the outer configuration of rod 26 so that rod 26 is movable in relatively close-fitting relationship thereto. As seen in FIG. 2, tube 27 is open at the top and thus communicates with the interior of pan 12 through an aperture 28 in bottom wall 14. Tube 27 also acts as a support for pan 12. As indicated by the dotted lines in FIG. 2, as water evaporates from pan 12, float member 23 moves down pan 12 with rod 26 movable in tube 27. Thus, any evaporation of water out of pan 12 is sensed by the movement of float member 23.

As particularly contemplated in the present invention, signal control means 29 are provided for controlling a signal which is responsive to the amount of water evaporation sensed by sensing means 21. Signal control means 29 includes a light response means 31 for controlling an electric signal which is responsive to the amount of light impinging thereon from an associated source of light positioned in alignment thereto and light shuttering means 38 for varying the amount of light reaching the cell from the light source in response to movement of the shuttering means 38. Linkage means 41 are also provided for coupling the shuttering means 38 to float means 22 for moving the shuttering means 38 in response to movement of float means 22.

Thus, in the exemplary embodiment, signal generator means 29 includes a light-tight box or housing 30 fixedly mounted on top plate 19 of support 15. Light responsive means 31 includes a light source 32 fixedly mounted on one side wall 33 of box or housing 30 generating a light beam across to the other side wall 34. Suitable leads 35 couple light source 32 to a source of electricity. A light responsive cell 36 such as a photocell which is responsive to light striking the cell to either generating an electric signal or having a varying resistance when struck by a light source is mounted on the outside of the other side wall 34 and in a position for actuation by the light beam from light source 32. Suitable leads 37 couple cell 36 to a source of electricity. As is well known in the photocell or photo resister art, cell 37 is adapted to control or affect an electric signal responsive to light from source 32 impinging thereon.

Signal control means 29 further includes light shuttering means 38 which includes a shutter 39 of generally opaque material having an irregularly shaped opening 40 therein. In the exemplary embodiment, opening 40 is preferably tear-shaped and thus wider at the bottom than at the top thereof, as shown, and aligned in the path of light from light source 32. Signal control means 29 further includes linkage means 41 in the form of a shaft 42 extending through an aperture 43 in box 30 fixed or keyed to one end of shutter 39. As shown, shutter 39 is preferably generally triangularly shaped with shaft 42 fixedly secured to the apex thereof.

Shaft 42 is a crank arm and includes a first portion 44 passing through a sleeve 45 fixed to side 34 of box 30 and having suitable bearings or bushings 46, 47 therein for providing rotation of shaft 42 with respect to sleeve 45. Shaft 42 includes an integral second portion 48 at generally a right angle to first portion 44 and an integral third portion 49 extending through a sleeve 50 fixedly secured to and extending at right angle to the uppermost portion of shaft or rod 26. When float means 21 moves up and down within pan 12, movement thereof rotates shaft 42 within sleeve 45 and thus moves shutter 39 between the solid and dotted line positions shown in FIG. 3. Due to the configuration of opening 40, this controls the amount of light striking cell 36 from light source 32. As can be seen by comparing FIGS. 1 and 3, the amount of light striking cell 36 is progressively decreased as float member 23 moves downwardly in pan 12 due to evaporation. Also due to the configuration of opening 40, the intensity of the light striking cell 36 is varied, such variation being correlated to the various levels of float member 23 in pan 12.

As particularly contemplated in the present invention, controller means 51 may be provided operatively connected to the signal control means 29 for controlling the duration of watering periods of at least portions of an irrigation system at least partially in response to signals affected or controlled by means 29. In the exemplary embodiment of the invention, such controller means 51 is shown schematically in FIG. 4 diagrammatically coupled to the evaporator pan means 11, the sensing means 21 and the signal control means 29. Controller means 51 includes a plurality of pilot valves 52, each valve 52 having a fluid inlet line 53 and a fluid outlet line 54 associated therewith. It is to be understood that lines 54 may be disposed in a suitable environment for irrigating a large area and thus the total number of lines, valves, etc. and placement thereof may vary.

Each pilot valve 52 is controlled by a conventional solenoid 55 coupled thereto, all of the solenoids 55 being electrically coupled to a conventional electric controller circuit 56 as is well known in the irrigation art. Circuit 56 is electrically coupled to both signal control means 29 and a solenoid 57 coupled to and controlling a pilot valve 58. Valve 58 is disposed in water inlet line 20 and a source of water from a remote source (not shown) is adapted to pass through valve 58 out of inlet 20 and into pan 12 to refill the same, when necessary, as will be discussed.

Circuit 56 is also coupled to a control console 59 housing therein suitable means for generating signals relating to time and duration for actuating circuit 56. Such means may include present day computer technology wherein a first computer means 60 may be provided for storing information relating to a particular time of day and number of times per week in which it is desired to actuate lines 54. A second computer means 61 may be provided for storing information relating to the duration of time it is adapted to run sprinklers or the like (not shown) coupled to lines 54. In both computer means 60, 61, the computers are adapted to have information punched in and store such information and generate signals to circuit 56 at the desired times. Of course, all of the foregoing may be carried out by known techniques for electronically and automatically supplying water to one or more sprinklers at desired times, as is known in the irrigation art. As shown in FIG. 4, each computer means 60, 61 is electronically coupled to circuit 56. However, as will be discussed, the circuit 56 is adapted to override computer means 60, 61 due to signals controlled by cell 36.

In operation, float pan 12 is mounted in a position whereby water may evaporate therefrom, as previously discussed. When the level of water in pan 12 is lowered due to evaporation, crank arm 42 lowers shutter 39 in FIG. 1 and moves it to the dotted line position in FIG. 3. This selectively reduces the intensity of light striking cell 36 from source 32 and, via leads 35, 37, controls a signal to circuit 56. Circuit 56 in turn signals solenoids 55 which open valves 52 to permit water from a remote source (not shown) to enter inlet lines 53 and exit out of outlet lines 54 to actuate sprinklers or the like (not shown) coupled to lines 54. The circuitry of controller circuit 56 may be such as to modulate the running time of all the sprinklers coupled to lines 54. That is, the intensity of the signal from cell 36 fed into circuit 56 indicates to the circuit the condition of pan 12 and thus the degree of moisture. Circuit 56 thus may run all the sprinklers coupled to lines 54 for the same length of time, selective ones for certain lengths of time, etc. Circuit 56 increases or decreases the running time of the sprinklers depending upon the water level in pan 12.

At the end of the irrigation cycle, after the last pilot valve (or valves) has been turned off, circuit 56 feeds a signal to solenoid 57 which actuates valve 58 to admit water via inlet line 20 into pan 12. Such signal may be preset so as to open valve 58 for a period of time to refill pan 12 to overflowing.

The signals from cell 36 due to the movement of the float member 23 in pan 12 is due to an integration of all of these factors: elapsed time from the previous irrigation, temperature, humidity, air movement and number of daylight hours. This results in a signal fed to controller circuit 56 to signal the controller how much water must be supplied for the next irrigation.

Conventional sprinkler controllers provide for a selection of the time of day and the number of days a week that a sprinkler program is to occur. Once a program starts, such controllers turn on and off a number of sprinkler valves, e.g, from one to 23 valves. Certain controllers provide for selectively setting the running time for each individual valve, and the time for any one valve may be set without affecting the running time of other valves. Such controllers would include signal generating means, such as means 60, 61. Thus, the means 60, 61 and the controller circuit 56 discussed herein may be such latter type of controller, actuated by signals from cell 36.

For example, each outlet line 54 may be considered a sprinkler station. Means 60, 61 and controller circuit 56 may be set to normally run a first station or sprinkle water for 30 minutes, a second station at 10 minutes, a third station at 60 minutes, etc. However, it may be that it has just rained and pan 12 is full. If the sprinkler program is about to start, a signal from cell 36 will be fed into controller circuit 56 thereby overriding computer means 60, 61 indicating that no watering is necessary and all stations are to be skipped. However, if the water level in pan 12 is down only about 0.05 inches, the signal from cell 36 signals the circuit 56 to run 20% of the set time. In the example given, section 1 would run 6 minutes instead of 30, section 2 would run 2 minutes instead of 10, section 3 would run 12 minutes instead of 60, etc.

However, if pan 12 were totally empty, the signal from cell 36 signals circuit 56 to run twice the normal length of time. Thus, sections 1, 2, 3, etc. would run 60, 20, 120 minutes, etc. At the end of the irrigation cycle, circuit 56 actuates solenoid 57 to open valve 56 to refill pan 12, as previously discussed.

It can be seen that I have disclosed a system and method for sensing the amount of water evaporated from a pan, converting that to a signal, that in combination with controller means, varies the running time of all the sprinklers operated by that controller means. Sprinklers are scheduled to operate at a predetermined time of day or night and, at that predetermined time, the amount of water evaporated from the pan since the previous irrigation would be sensed and would determine the running time for the sprinklers. At the end of that irrigation cycle, the pan would be automatically refilled.

Any suitable light response means for controlling an electric signal may be used for cell 36. For example, photocells are known which generate a small amount of electricity when light strikes the cell. Other types of cells have a varying resistance which varies with the amount of light striking the cells. Either type of cell may be used to control the electric signal fed to controller means 51.

Any suitable circuitry, valves, solenoids, etc. may be used. For example, in my copending application entitled "Water Valve Operating Solenoid," Ser. No. 670,983 filed Mar. 26, 1976 also commonly assigned, I describe and claim a valve and solenoid combination particularly suited for use in controlling water flow to sprinklers or the like. Such solenoid actuated valves may be used for pilot valves 52 and solenoids 55, discussed hereinabove.

I claim:

1. A method of controlling the operation of a plurality of pilot valves associated with water lines of an irrigation system for watering a desired soil area comprising the steps of:
    providing a body of water in a container adjacent said soil area and exposing said water to the combined evaporative effects of the ambient weather conditions at the location of said irrigation system;
    continually sensing the change in volume of water of said body of water as it occurs in response to evaporation thereof at all times and at all levels thereof;
    generating an electrical signal responsive to the change in water volume continually being sensed in response to said combined evaporative effects occurring prior to the initiation of watering without physically measuring the amount of moisture present in the soil of the area being watered; and
    modifying the operation of an electrically operated controller mechanism by said signal to vary the duration of the controller mechanism operation of said pilot valves.

2. A method of controlling an electrical signal for input to an electrically operated controller of an irrigation system in response to varying ambient weather conditions comprising the steps of:

exposing a contained body of water to ambient weather conditions relative said irrigation system at a soil area desired to be watered whereby the rate of evaporation of water therefrom varies as an integrated result of varying factors of said weather conditions at said soil area;

continually sensing the amount of water evaporated from said body of water relative to an initial volume of water at all times and at all levels thereof; and generating an electrical signal in response to the amount of water evaporation continually being sensed by said sensing means in response to said integrated result of varying factors of said weather conditions occurring prior to the initiation of watering without physically measuring the amount of moisture present in the soil of the area being watered, and effecting cut-off of flow through the irrigation system controller as a function of said electrical signal.

3. A method for controlling the operation of a plurality of sprinklers at a soil area desired to be watered comprising the steps of;

filling a pan with water at a predetermined location adjacent the location of said sprinklers;

continually sensing the amount of water evaporated from said pan during a predetermined period at all times and at all levels thereof, said predetermined period occurring just prior to the initiation of sprinkling;

generating a signal varying in relation to the amount of water evaporated from said pan being continually sensed during said predetermined period in response to said signal related to said sensed amount of water without physically measuring the amount of moisture present in the soil of the area being watered; and operating said sprinklers to spray water thereout for a predetermined period of time related to said sensed amount of water.

4. In the method of claim 3 including the step of refilling said pan with water after said sprinklers are operated for said predetermined period of time.

5. In the method of claim 3 wherein the step of operating said sprinklers includes the step of operating a plurality of sprinklers for different durations of time dependent upon the sensed amount of water evaporated from said pan.

6. An evaporator pan moisture sensor control apparatus for controlling the watering periods of an irrigation system in response to ambient weather conditions comprising:

evaporator pan means for exposing a contained body of water to ambient weather conditions relative said irrigation system whereby the rate of evaporation of water therefrom varies as an integrated result of varying factors of said weather conditions;

sensing means for continually sensing the amount of water evaporated from said evaporator pan means relative to an initial volume of water contained therein, said sensing means comprising means for sensing the total amount of water in said pan means at any time and at all levels therein;

signal generating means for generating a signal which is continuously responsive to the amount of water evaporation sensed by said sensing means in the area being watered by said irrigation system; and controller means for controlling the duration of watering periods in accordance with ambient weather condition factors occurring prior to the initiation of said watering periods at least partially in response to the signal generated by said signal generating means whereby said controller means is operable as a result of said varying factors of said weather conditions without physically measuring the amount of moisture present in the soil of the area being watered.

7. The apparatus of claim 6 wherein said sensing means comprises:

float means for floating on the surface of said body of water; and guide means for guiding said float means to move in a predetermined path of travel in responses to changes in the volume of said body of water.

8. The apparatus of claim 7 wherein said signal control means comprises:

light responsive cell means for controlling an electric signal responsive to the amount of light impinging thereon from an associated source of light positioned in alignment thereto;

light shuttering means for varying the amount of light reaching said light responsive cell means from said source in response to movement of said shuttering means; and linkage means for connecting said shuttering means to said float means for moving said shuttering means in response to movement of said float means.

9. The apparatus of claim 6 wherein said sensing means comprises a floatable member positioned on said body of water and said signal control means includes both light responsive means for controlling an electrical signal responsive to the amount of light impinging thereon and means for controlling the amount of light impinging on said light responsive means in response to movement of said float means.

10. Apparatus for controlling the operation of a plurality of sprinklers at a soil area desired to be watered comprising:

a pan adapted to contain water therein;

sensing means operatively connected to said pan for continually sensing the amount of water evaporated from said pan during a predetermined period at all times and at all levels thereof, said predetermined period occurring just prior to the initiation of sprinkling;

signal generating means associated with said sensing means for generating a signal varying in relation to the amount of water evaporated from said pan continually being sensed during said predetermined period; and controller means coupled to both said signal generating means and said sprinklers for operating said sprinklers for a predetermined period of time related to said signal related to sensed amount of water whereby said controller means is operable as a result of said sensed amount of water without physically measuring the amount of moisture present in the soil of the area being watered.

11. In the apparatus of claim 10 including pan refilling means associated with said controller means for refilling said pan with water after said sprinklers are operated for said predetermined period of time.

12. In the apparatus of claim 10 wherein said controller means includes means for operating said sprinklers for differing durations of time related to said sensed amount of water.

13. An evaporator pan moisture sensor control apparatus for controlling the watering periods of an irrigation system in response to ambient weather conditions comprising:

evaporator pan means for exposing a contained body of water to ambient weather conditions relative said irrigation system whereby the rate of evaporation of water therefrom varies as an integrated result of varying factors of said weather conditions;

sensing means for sensing the amount of water evaporated from said evaporator pan means relative to an initial volume of water contained therein, said sensing means comprising float means for floating on the surface of said body of water, and guide means for guiding said float means to move in a predetermined path of travel in responses to changes in the volume of said body of water;

signal control means for controlling a signal which is responsive to the amount of water evaporation sensed by said sensing means, said signal control means comprising light responsive cell means for controlling an electric signal responsive to the amount of light impinging thereon from an associated source of light positioned in alignment thereto, light shuttering means for varying the amount of light reaching said light responsive cell means from said source in response to movement of said shuttering means, and linkage means for connecting said shuttering means to said float means for moving said shuttering means in response to movement of said float means, and controller means for controlling the duration of watering periods of at least portions of said irrigation system at least partially in response to the signal controlled by said signal control means.

14. The apparatus of claim 13 wherein said light shuttering means includes an opaque shutter disposed in the path of light from said source of light between said source of light and said light responsive cell means, said shutter having an opening therethrough through which said path of light passes, and said linkage means being fixed to said shutter for moving said shutter in response to movement of said float means.

15. The apparatus of claim 14 wherein said opening includes light intensity varying means related to the height of water in said pan means for varying the intensity of light passing through said opening dependent upon the position of said float means in said pan means.

16. An evaporator pan moisture sensor control apparatus for controlling the watering periods of an irrigation system in response to ambient weather conditions comprising:

evaporator pan means for exposing a contained body of water to ambient weather conditions relative said irrigation system whereby the rate of evaporation of water therefrom varies as an integrated result of varying factors of said weather conditions;

sensing means for sensing the amount of water evaporated from said evaporator pan means relative to an initial volume of water contained therein;

signal control means for controlling a signal which is responsive to the amount of water evaporation sensed by said sensing means; and controller means for controlling the duration of watering periods of at least portions of said irrigation system at least partially in response to the signal controlled by said signal control means, said sensing means comprising a floatable member positioned on said body of water and said signal control means including both light responsive means for controlling an electrical signal responsive to the amount of light impinging thereon and means for controlling the amount of light impinging on said light responsive means in response to movements of said float means.

* * * * *